United States Patent
Yeung (10) Patent No.: US 8,699,952 B2
(45) Date of Patent: Apr. 15, 2014

(54) ELECTRONIC APPARATUS, PROXIMITY NETWORK SYSTEM AND CONNECTING METHOD THEREOF

(75) Inventor: Sip Kim Yeung, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 234 days.

(21) Appl. No.: 13/274,407

(22) Filed: Oct. 17, 2011

(65) Prior Publication Data

US 2012/0258665 A1    Oct. 11, 2012

(30) Foreign Application Priority Data

Apr. 8, 2011    (TW) .............................. 100112242 A (51) Int. Cl.
*H04B 7/00*    (2006.01)
(52) U.S. Cl.
USPC .................. 455/41.2; 455/73; 455/404.2
(58) Field of Classification Search
USPC ................. 455/41.1, 41.2, 73, 404.2, 550.1
See application file for complete search history.

(56) References Cited

U.S. PATENT DOCUMENTS

| 7,035,624 | B2 * | 4/2006 | Maegawa ................... 455/414.1 |
| 2003/0073431 | A1 * | 4/2003 | Dorenbosch ................. 455/417 |
| 2009/0156126 | A1 | 6/2009 | Willis | |
| 2010/0167711 | A1 | 7/2010 | Alameh et al. | |

FOREIGN PATENT DOCUMENTS

WO    WO 03/009621 A1    1/2003

* cited by examiner

*Primary Examiner* — Tuan H Nguyen
(74) *Attorney, Agent, or Firm* — Alan Kamrath; Kamrath IP Lawfirm, P.A.

(57) ABSTRACT

A proximity network system includes a plurality of Bluetooth devices disposed respectively in each one of a plurality of electronic apparatuses. The Bluetooth devices are arranged for enabling the electronic apparatuses to receive and transmit Bluetooth wireless signals with each other. Each Bluetooth device includes a community relationship module, an identifying module and a distance detecting module. The community relationship module stores a community relationship data of each Bluetooth device. The identifying module reads the community relationship data of each Bluetooth device to identify whether each Bluetooth device has the same community relationship. The distance detecting module determines whether each Bluetooth device is in a proximity network. When the Bluetooth devices are identified to have the same community relationship with each other and are in the proximity network, each electronic apparatus is allowed to receive and transmit the Bluetooth wireless signals with another electronic apparatus.

14 Claims, 7 Drawing Sheets

ELECTRONIC APPARATUS, PROXIMITY NETWORK SYSTEM AND CONNECTING METHOD THEREOF

BACKGROUND OF THE INVENTION

1. Field of the Invention

The present invention relates to a proximity network system and, more particularly, to a proximity network system used for connecting a plurality of electronic apparatuses having a same community relationship, and a connecting method thereof.

2. Description of the Related Art

The advancement of information and communication technologies and the trend of electronic apparatuses becoming lighter, thinner, shorter and smaller have tightened the relationships of people. From the early days of heavy notebook PCs to the modern days of smart phones, mobile internet devices (MID) or tablet PCs, people now have better choices for social occasions and family gatherings. In these occasions, almost all the people have smart phones, MID or tablet PCs. Therefore, it would be extremely useful to provide a proximity network to connect electronic apparatuses within a range of three to five meters, which is a suitable range for an Ad-Hoc wireless network to be effective in a social meeting or a group discussion.

Many practical and possible applications could be implemented by using this kind of proximity network to extend interactions among people. For example, people in the same proximity network could share documents, or could use particular hand gestures that could only be done in a very small area of a proximity network.

However, many issues have to be solved beforehand in order to realize this kind of proximity network. First, it is a challenge how to help a user of an electronic apparatus to find another electronic apparatus (and/or its user) in a range of three to five meters, and more particularly, to help the user find only people with a common view and their apparatuses. Second, it is another challenge how to form a group of the electronic apparatuses connected to the same proximity network to avoid distribution from other proximity networks. Furthermore, the battery's life is very important for an electronic community apparatus. If the operation system of the electronic apparatus is woken up for searching the nearby proximity network, the electronic apparatus may consume a lot of power. When the operation system is woken up, the processing unit and the memory are woken up to operate the software or firmware, which will consume the power of the battery. On the other hand, issues remain to solve how to allow the electronic apparatus to identify the nearby electronic apparatus without waking up the operating system? For the nearby electronic apparatus, how to respond to the identification request without waking up the operating system?

Therefore, it is advantageous to provide a proximity network system and a connection method thereof to solve the problems encountered currently in the information technology and communication technology fields.

SUMMARY OF THE INVENTION

It is an object of the present invention to provide a proximity network system used for connecting a plurality of electronic apparatuses having a same community relationship in a proximity network.

In order to achieve the above object, the present invention provides a proximity network system comprising a plurality of Bluetooth devices disposed respectively in each one of the plurality of electronic apparatuses. The plurality of Bluetooth devices are arranged for enabling the plurality of electronic apparatuses to receive and transmit Bluetooth wireless signals with each other. Each Bluetooth device comprises: a community relationship module arranged for storing a community relationship data of each Bluetooth device; an identifying module arranged for reading the community relationship data of each Bluetooth device to identify whether each Bluetooth device has the same community relationship; and a distance detecting module arranged for determining whether each Bluetooth device is in the proximity network. Hence, when the Bluetooth devices are identified to have the same community relationship with each other and are in the proximity network, each electronic apparatus is allowed to receive and transmit the Bluetooth wireless signals with another electronic apparatus via the corresponding Bluetooth device.

The present invention also discloses a proximity network connecting method used for the proximity network system, with the proximity network connecting method comprising: storing a community relationship data in each Bluetooth device; reading the community relationship data of each Bluetooth device to identify whether each Bluetooth device has the same community relationship; determining whether each Bluetooth device is in the proximity network; and when the Bluetooth devices are identified to have the same community relationship with each other and are in the proximity network, each electronic apparatus is allowed to receive and transmit the Bluetooth wireless signals with another electronic apparatus via the corresponding Bluetooth device.

The present invention also discloses an electronic apparatus used for the proximity network system. The electronic apparatus comprises a Bluetooth device for establishing a proximity network. The Bluetooth device comprises a community relationship module, an identifying module, and a distance detecting module. The community relationship module is arranged for storing a community relationship data of the Bluetooth device. The identifying module is arranged for determining whether a neighboring Bluetooth device corresponds to the community relationship data to identify whether the Bluetooth device and the neighboring Bluetooth device have a same community relationship. The distance detecting module is arranged for detecting a distance between the Bluetooth device and the neighboring Bluetooth device to determine whether the neighboring Bluetooth device is in the proximity network. When the neighboring Bluetooth device is in the proximity network and is identified to have the same community relationship of the Bluetooth device, the electronic apparatus is allowed to establish a connection with the neighboring Bluetooth device via the Bluetooth device.

Through the implementation of the present invention, each Bluetooth device may identify other Bluetooth devices having the same community relationship in the proximity network and may choose to connect with the Bluetooth devices for data transmission to enhance the functionality of the wireless network.

DETAILED DESCRIPTION OF THE PREFERRED EMBODIMENT EMBODIMENTS

The present invention discloses a proximity network system comprising electronic apparatuses having Bluetooth transmission capabilities to transmit/receive Bluetooth signals in the proximity network. The electronic apparatus may be a smart phone, portable computer, personal data assistant (PDA) or other electronic apparatuses having Bluetooth transmission capabilities or the like.

The proximity network system comprises a plurality of Bluetooth devices disposed respectively in each one of the plurality of electronic apparatuses. Each Bluetooth device uses a Bluetooth 4.0 standard LE link component, which is designed to reduce the number of channels for searching and to increase the channel search speed. Additionally, the Bluetooth 4.0 standard LE link component saves 1 to 3 mW of power consumption as compared with the traditional Bluetooth 3.0 component. Moreover, the Bluetooth 4.0 standard LE link component can work independently to communicate with another Bluetooth device of another electronic apparatus without waking up the system or the CPU of the electronic apparatus to perform the operation. Therefore, the Bluetooth device can work independently without being affected by the operating status of the electronic apparatus, thereby extending the duration of the electronic apparatus.

Figure 1:
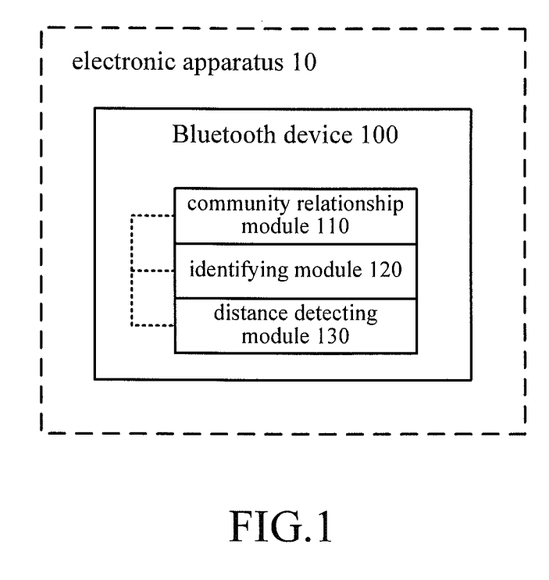
FIG. 1 illustrates a system block diagram of each electronic apparatus of a proximity network system in a first embodiment of the present invention.

FIG. 1 illustrates a system block diagram of each electronic apparatus 10 of a proximity network system in a first embodiment of the present invention. As shown in FIG. 1, in the proximity network system, a Bluetooth device 100 of each electronic apparatus 10 comprises a community relationship module 110, an identifying module 120, and a distance detecting module 130, and these modules are electrically connected with each other. In an embodiment of the present invention, each Bluetooth device 100 can be a processing chip. Each module can be a corresponding firmware stored in the processing chip, but each module can also be embodied in a physical circuit, a firmware or software, or a combination thereof.

The community relationship module 110 stores a community relationship data of each Bluetooth device 100. The user can define at least one group and its members by him/herself, and a community relationship data corresponding to each Bluetooth device 100 is generated by using the Bluetooth device 100 to perform an apparatus matching function with other Bluetooth devices or inputting a user-defined data. In this way, the user can add new members to the group and can store all the community relationship data in the community relationship module 110 for later application. The community relationship data can comprise a group name, member names, and identifications for Bluetooth devices corresponding to all members (such as a Bluetooth ID).

The identifying module 120 reads the community relationship data of each Bluetooth device 100 to identify whether each Bluetooth device 100 has the same community relationship. The identifying module 120 receives an advertising message from each neighboring Bluetooth device 100 to identify the existence of another Bluetooth device 100. At this time, the identifying module 120 may compare the community relationship data stored in the community relationship module 110 with the community relationship data provided by each existing Bluetooth device 100. Therefore, each Bluetooth device 100 having the same community relationship or having a different community relationship may be identified.

The distance detecting module 130 determines whether each Bluetooth device 100 is in the proximity network. The proximity network is formed by any Bluetooth device 100 and has a covering range defined by the maximum reach of the signal transmitted by the Bluetooth device 100. Therefore, the distance detecting module 130 can detect distances of other Bluetooth devices with respect to the Bluetooth device, thereby determining whether other Bluetooth devices are in the proximity network formed by the Bluetooth device. According to the specification of the Bluetooth 4.0 standard LE link component, the proximity network formed by the Bluetooth device 100 is in a range of 3 to 5 meters from the center of the Bluetooth device 100. In this embodiment, the distance detecting module 130 can be a received signal strength indicator (RSSI) detecting module. The RSSI detecting module may obtain a corresponding received signal strength indication according to a signal strength of each neighboring Bluetooth device 100, thereby identifying a distance between the Bluetooth device 100 and each neighboring Bluetooth device, and determining whether the neighboring Bluetooth devices are in the proximity network formed by the Bluetooth device 100.

Figure 2:
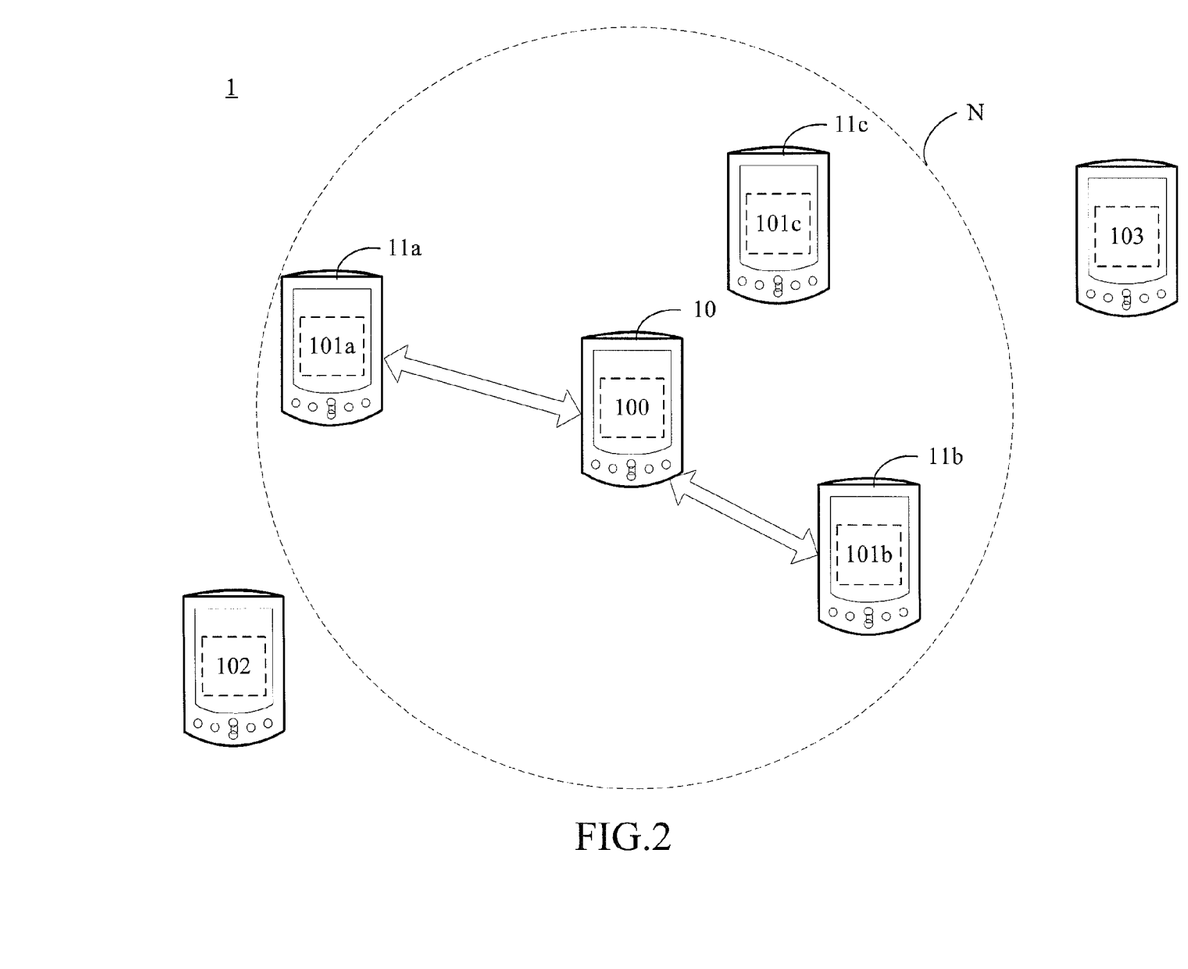
FIG. 2 illustrates an embodiment view of using the proximity network system of the present invention.

FIG. 2 illustrates an embodiment view of using the proximity network system 1 of the present invention. Each Bluetooth device 100 can be in an advertiser mode or a scanner mode based on a user command or its own status. In the advertiser mode, the Bluetooth device 100 continuously sends out advertising messages. At this time, the Bluetooth device 100 may operate without the electronic apparatus 10 enabling the system or CPU, thereby reducing power consumption. In the scanner mode, the Bluetooth device 100 forms a proximity network N and notifies the electronic apparatus 10 to enable the system or CPU. The Bluetooth device 100 may perform a cyclic search with respect to the proximity network N to identify the existence of neighboring Bluetooth devices.

As shown in FIG. 1 and FIG. 2, when any Bluetooth device 100 is switched to the scanner mode, a proximity network N is formed in a certain area of the physical space according to the Bluetooth device 100. When the Bluetooth device 100 receives the advertising messages from neighboring Bluetooth devices 101a, 101b, 101c, 102, 103 in the advertiser mode, the distance detecting module 130 of the Bluetooth device 100 determines whether these neighboring Bluetooth devices 101a, 101b, 101c, 102, 103 are in the proximity network N. For example, the neighboring Bluetooth devices 101a, 101b, 101c are in the proximity network N and the neighboring Bluetooth devices 102, 103 are outside the proximity network N, so the neighboring Bluetooth devices 102, 103 are excluded by the distance detecting module 130.

Then, the identifying module 120 of the Bluetooth device 100 reads the community relationship data of the neighboring Bluetooth device 101a, 101b, 101c in the advertiser mode and compares the community relationship data with the community relationship data stored in the community relationship module 110. According to the comparing result of the identifying module 120, if the community relationship data of the neighboring Bluetooth devices 101a, 101b corresponds to that stored in the community relationship module 110, and the community relationship data of the neighboring Bluetooth device 101c does not correspond to that stored in the community relationship module 110, it means that the Bluetooth device 100 and the neighboring Bluetooth devices 101a, 101b have the same community relationship, and the Bluetooth device 101c having a different community relationship may be excluded.

In an embodiment of the present invention, the Bluetooth device 100 of the electronic apparatus 10 will generate a notification message and display the notification message, for example, on a display of the electronic apparatus 10 to inform the user of the electronic apparatus 10 that the neighboring Bluetooth devices 101a, 101b having the same community relationship are in the proximity network N, which means the corresponding electronic apparatuses 11a, 11b, 11c exist in the proximity network N. When the user wishes to connect to another Bluetooth device, he/she can use the Bluetooth device 100 of the electronic apparatus 10 to establish a connection with the neighboring Bluetooth devices 101a, 101b of the electronic apparatuses 11a, 11b in the proximity network N and to transmit/receive Bluetooth wireless signals with each other. When the Bluetooth device 100 and the neighboring Bluetooth devices 101a, 101b are connected confirmatively, the system or CPU of each one of the electronic apparatuses 11a, 11b can be enabled by the neighboring Bluetooth devices 101a, 101b respectively to perform subsequent operations such as interactive command input or data transmission.

Therefore, according to the specification of the Bluetooth 4.0 standard LE link component, a user of an electronic apparatus can find a familiar user through the proximity network constructed by the Bluetooth device and wakes up the electronic apparatus of another user for data transmission between both parties or among many parties and also for interactive operations.

Figure 3:
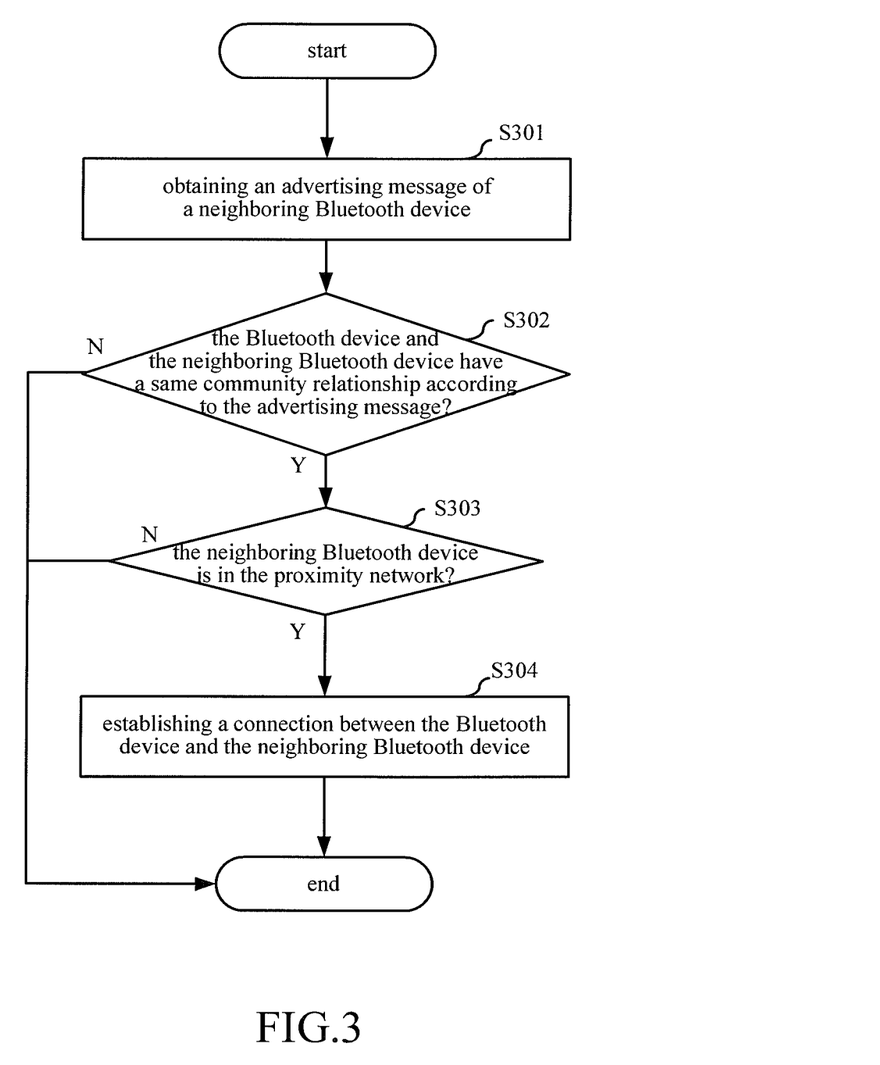
FIG. 3 illustrates a flow chart of a proximity network connecting method for the electronic apparatuses in the first embodiment of the present invention.

FIG. 3 illustrates a flow chart of a proximity network connecting method for the electronic apparatuses in the first embodiment of the present invention. As shown in FIG. 3, the proximity network connecting method comprises step S301 to step S304, which will be described below in detail.

Step S301: obtaining an advertising message of a neighboring Bluetooth device. When a Bluetooth device of an electronic apparatus is in the scanner mode, it will form a proximity network. If a neighboring Bluetooth device in the advertiser mode is near the Bluetooth device, the Bluetooth device will receive the advertising message from the neighboring Bluetooth device. The advertising message comprises data regarding the neighboring Bluetooth device, such as a device name, an ID number and so on.

Step S302: determining whether the Bluetooth device and the neighboring Bluetooth device have a same community relationship according to the advertising message. The identifying module of the Bluetooth device compares the received advertising message with the community relationship data stored in the community relationship module. When the relative data in the advertising message of the neighboring Bluetooth device corresponds to the group or member data of the community relationship data, the identifying module may determine that the Bluetooth device and the neighboring Bluetooth device have the same community relationship, If not, then, the two Bluetooth devices do not have the same community relationship.

Step S303: determining whether the neighboring Bluetooth device is in the proximity network. The Bluetooth device detects a distance between the Bluetooth and the neighboring Bluetooth device by the distance detecting module and determines whether the neighboring Bluetooth device is in the proximity network based on the detected distance.

Step S304: establishing a connection between the Bluetooth device and the neighboring Bluetooth device. When the Bluetooth device and the neighboring Bluetooth device are determined to have the same community relationship by step S302, and the neighboring Bluetooth device is identified to be in the proximity network by step S303, the Bluetooth module is allowed to establish a connection with the neighboring Bluetooth device to transmit and receive Bluetooth wireless signals with each other.

Figure 4:
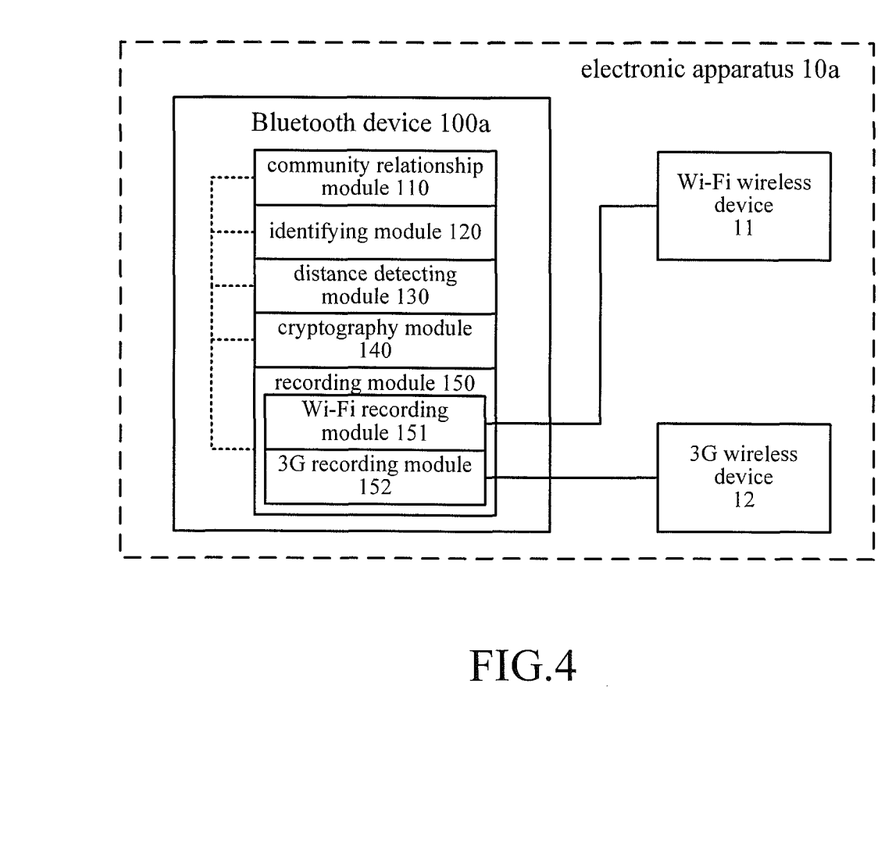
FIG. 4 illustrates a system block diagram of each electronic apparatus of a proximity network system in a second embodiment of the present invention.

FIG. 4 illustrates a system block diagram of each electronic apparatus 10a of a proximity network system 1a in a second embodiment of the present invention. In another embodiment of the present invention, a Bluetooth device 100a of each electronic apparatus 10a further comprises a cryptography module 140 arranged for storing password data corresponding to each Bluetooth device 100a in the same group. For security concerns of device and network connection, a user of the electronic apparatus 10a can set a connection password for preventing malicious connections. Therefore, when the user sets up a group and its members at the beginning, he/she can also store password data corresponding to the community relationship data of each Bluetooth device 100a. When the Bluetooth device 100a and the neighboring Bluetooth device are identified to have the same community relationship and both are in the proximity network, it is possible to query the password data of the cryptography module 140 to determine whether the obtained password data corresponds to the password data stored in the cryptography module 140. If the obtained password data is correct, the electronic apparatus 10a is allowed to transmit and receive Bluetooth wireless signals via the Bluetooth device 100a with the neighboring Bluetooth device, thereby enhancing the data transmission security.

Moreover, since many electronic apparatuses are equipped with Wi-Fi wireless devices and/or 3G wireless devices, in an embodiment of the present invention, each electronic apparatus 10a further comprises a Wi-Fi wireless device 11 or a 3G wireless device 12. Each Bluetooth device 100a further comprises a recording module 150 for storing a Wi-Fi address of the Wi-Fi wireless device 11, or an International Mobile Equipment Identity (IMEI) of the 3G wireless device 12. The Bluetooth device 100a is suitable for transmitting signals having low power consumption and low data rate, but it can not meet the requirement of transmitting a large amount of data and providing faster data rate. Therefore, when the electronic apparatus 10a is allowed to establish an connection with the neighboring electronic apparatus, it can read the Wi-Fi address or the IMEI of the neighboring electronic apparatus via the recording module 150. After the electronic apparatus 10a obtains the Wi-Fi address or the IMEI of each neighboring electronic apparatus, the electronic apparatus 10a can use the Wi-Fi wireless device 11 or the 3G wireless device 12 to communicate with the neighboring electronic apparatus via different types of wireless signals. In this embodiment, the electronic apparatus 10a is equipped with the Wi-Fi wireless device 11 and the 3G wireless device 12, and the Wi-Fi wireless device 11 and the 3G wireless device 12 work with a corresponding Wi-Fi recording module 151 and 3G recording module 152 of the recording module 150 respectively to provide Wi-Fi and 3G wireless transmission capabilities. However, in another embodiment, the electronic apparatus 10a can have only one of the Wi-Fi wireless device 11 and the 3G wireless device 12, which works with the recording module 150 to provide a single type of wireless transmission capability.

Figure 5:
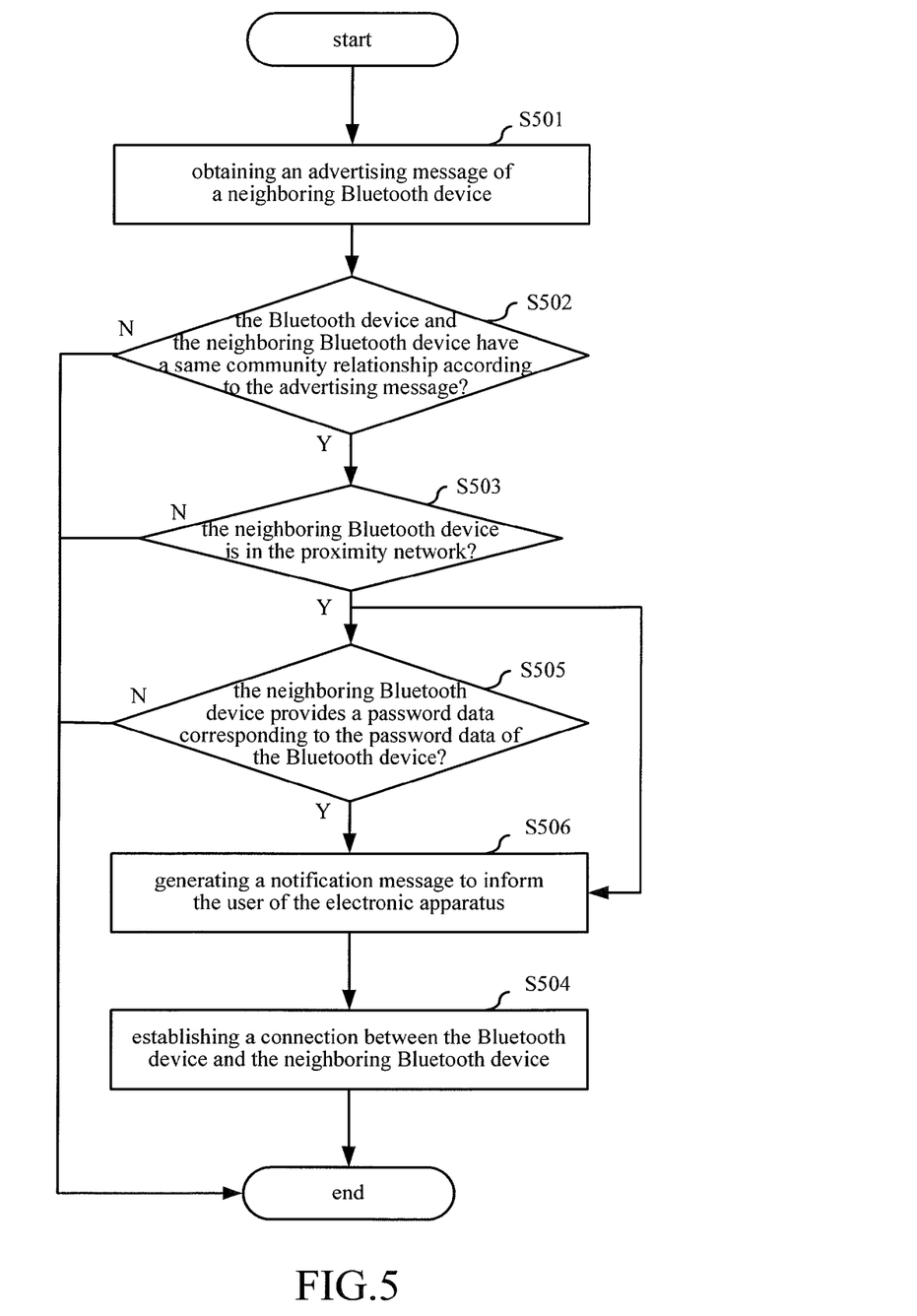
FIG. 5 illustrates a flow chart of a proximity network connecting method for the electronic apparatuses in a second embodiment of the present invention.

FIG. 5 illustrates a flow chart of a proximity network connecting method for the electronic apparatuses in a second embodiment of the present invention. As shown in FIG. 5, the proximity network connecting method comprises steps S501 to S504, which are the same as the steps S301 to S304, but the proximity network connecting method further comprises step S505 and step S506, which will be described in details detail.

Step S505: determining whether a password data provided by the neighboring Bluetooth device corresponds to the password data of the Bluetooth device. Before establishing a connection, the cryptography module of the Bluetooth device can ask the neighboring Bluetooth device to provide a corresponding password data. If the password data provided by the neighboring Bluetooth device corresponds to the password data set by the cryptography module 140, the process goes to step S504. Otherwise, the connection is aborted.

Step S506: generating a notification message to inform the user of the electronic apparatus. When the neighboring Bluetooth device is identified to have the corresponding community relationship and to be in the proximity network in steps S502 and S503 (and the password data provided by the neighboring Bluetooth device corresponds to the password data of the Bluetooth device in step S505), the Bluetooth device is arranged for generating a notification message to inform the user of the electronic apparatus that a neighboring Bluetooth device is in the proximity network. This notification message can be an image on a display of the electronic apparatus or can be presented as a voice or sound message.

Therefore, the present invention provides a security mechanism by setting up password data for the user of the electronic apparatus. When another electronic apparatus having the same community relationship is in the proximity network, the present invention can use a notification message to inform the user, thereby enhancing the usability and convenience of the electronic apparatus of the present invention.

Figure 6:
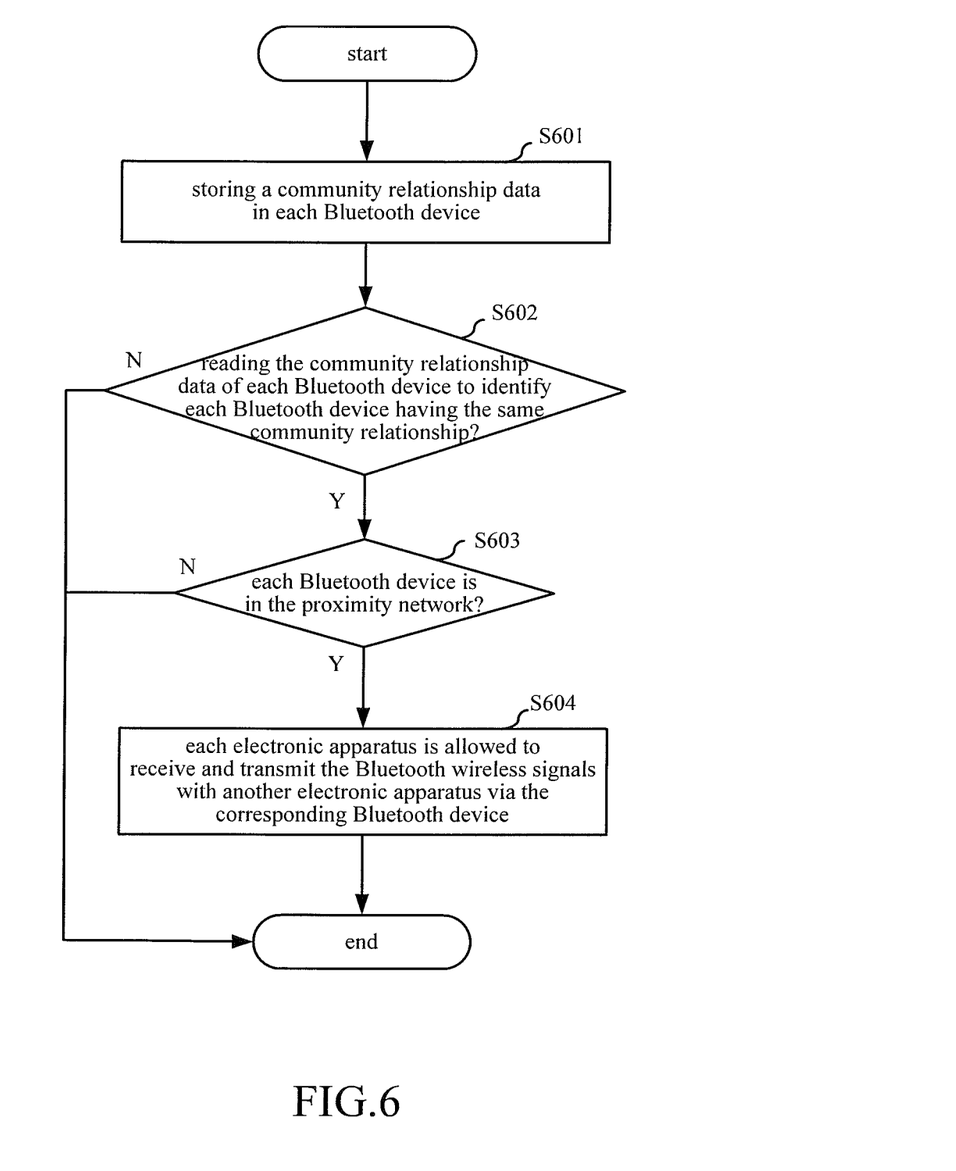
FIG. 6 illustrates a flow chart of the proximity network connecting method for the proximity network system.

FIG. 6 illustrates a flow chart of the proximity network connecting method for the proximity network system. As shown in FIG. 6, the proximity network connecting method comprises steps S601 to S604, which will be described in detail.

Step S601: storing a community relationship data in each Bluetooth device. Each user of each electronic apparatus can store a community relationship data in his/her own Bluetooth device, and the community relationship data stores data related to at least one group and its members (Bluetooth devices).

Step S602: reading the community relationship data of each Bluetooth device to identify whether each Bluetooth device has the same community relationship. Each Bluetooth device determines whether another Bluetooth device has the same community relationship with it by reading its own community relationship data to compare with a community relationship data obtained from the other Bluetooth device.

Step S603: determining whether each Bluetooth device is in the proximity network. The Bluetooth device in the scanner mode may detect a distance between the Bluetooth device and each Bluetooth device by its own distance detecting module to determine whether each Bluetooth device is in the proximity network.

Step S604: when the Bluetooth devices are identified to have the same community relationship with each other and are in the proximity network, each electronic apparatus is allowed to receive and transmit the Bluetooth wireless signals with another electronic apparatus via the corresponding Bluetooth device. When it is determined that each Bluetooth device has the same community relationship and is in the proximity network in steps S602 and S603, each Bluetooth device is allowed to transmit and receive Bluetooth wireless signals with any neighboring Bluetooth device having the same community relationship and being close enough to the Bluetooth device.

Figure 7:
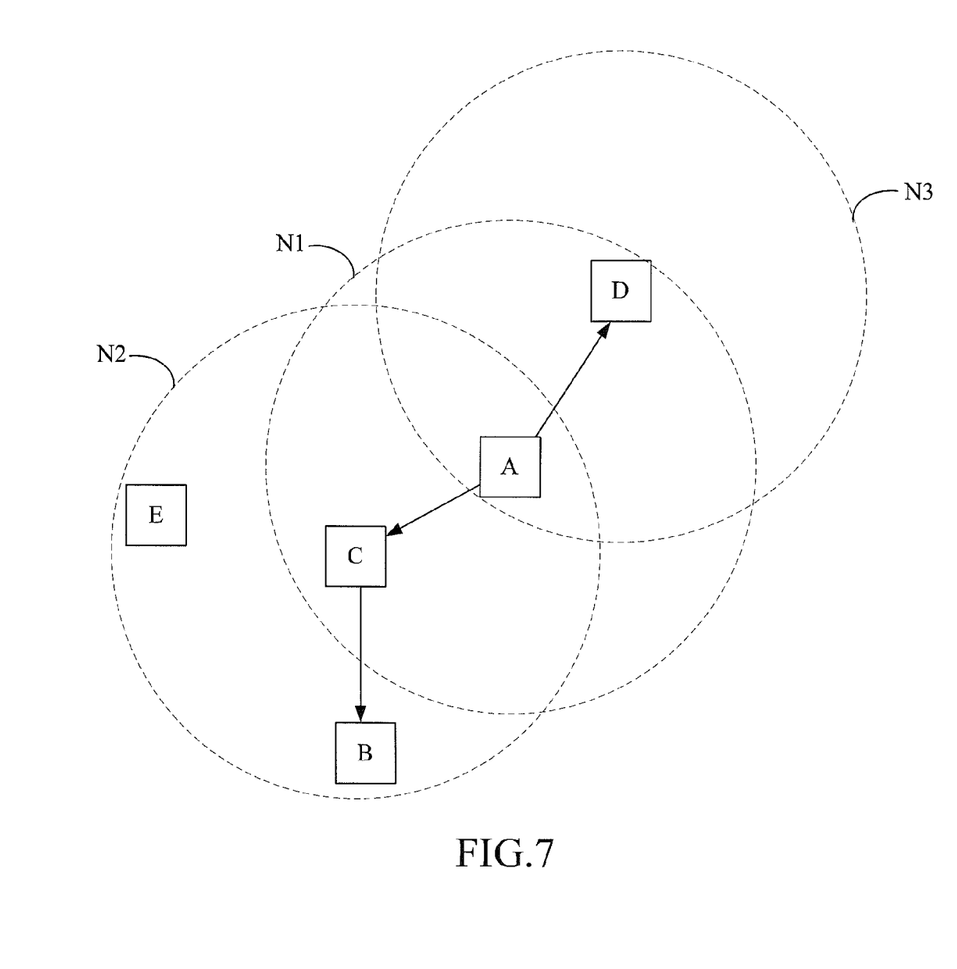
FIG. 7 illustrates a scenario view of using the proximity network system of the present invention for executing a searching function.

Furthermore, the present invention can also provide a search function for searching devices not in the proximity network. FIG. 7 illustrates a scenario view of using the proximity network system of the present invention for executing a searching function. Any Bluetooth device of the present invention can detect whether a neighboring Bluetooth device has the same community relationship and also is in the proximity network, and if so, the Bluetooth device establishes a connection with the neighboring Bluetooth device. As shown in FIG. 7, in an embodiment of the present invention, if a user wants to use a Bluetooth device A to search for a target Bluetooth device B having the same community relationship, but only identifies Bluetooth devices C and D having the same community relationship in a proximity network N1 formed by the Bluetooth device A, the user can use the Bluetooth device A to establish connections with the Bluetooth device C and D respectively and wakes up their corresponding electronic apparatuses. Then, the proximity network N2 formed by the Bluetooth device C and the proximity network N3 formed by proximity network N3 can be searched to find whether the target Bluetooth device B exists in either proximity network.

If the target Bluetooth device B is found in the proximity network N2, the Bluetooth device C will transmit relative data of the Bluetooth device B to the Bluetooth device A. Therefore, the user will know the Bluetooth device B is in a range of 3 to 5 meters around the Bluetooth device C and will find the target Bluetooth device B easily. If the neighboring Bluetooth device C does not find the Bluetooth device B, the user can keep looking for the target Bluetooth device B by the Bluetooth device C to establish connections with other Bluetooth devices (such as a Bluetooth device E) having the same community relationship with the Bluetooth device C and being in the proximity network N2 and so on. Therefore, the proximity network system of the present invention can form a chain search network to enhance the search function of the Bluetooth devices having the same community relationship.

It is noted that the above-mentioned embodiments are only for illustration, and it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A proximity network system for connecting a plurality of electronic apparatuses having a same community relationship in a proximity network, with the proximity network system comprising:

a plurality of Bluetooth devices disposed respectively in each one of the plurality of electronic apparatuses and arranged for enabling the plurality of electronic apparatuses to receive and transmit Bluetooth wireless signals with each other, wherein each Bluetooth device comprises:

a community relationship module arranged for storing a community relationship data of each Bluetooth device;

an identifying module arranged for reading the community relationship data of each Bluetooth device to identify whether each Bluetooth device has the same community relationship;

a distance detecting module, arranged for determining whether each Bluetooth device is in the proximity network; and a cryptography module arranged for storing a password data, wherein when the plurality of Bluetooth devices are identified to have the same community relationship with each other and are in the proximity network, each electronic apparatus is allowed to receive and transmit the Bluetooth wireless signals with another electronic apparatus via the corresponding Bluetooth device when each Bluetooth device provides the same password data.

2. The proximity network system as claimed in claim 1, wherein each distance detecting module is a received signal strength indicator (RSSI) detecting module.

3. The proximity network system as claimed in claim 1, wherein each identifying module reads the community relationship data of each Bluetooth device when each Bluetooth device is in an advertiser mode.

4. The proximity network system as claimed in claim 1, wherein each Bluetooth device further comprises:
a recording module arranged for recording a Wi-Fi address of a Wi-Fi wireless device of each electronic apparatus, or an International Mobile Equipment Identity (IMEI) of a 3G wireless device.

5. A proximity network connecting method for connecting a plurality of electronic apparatuses having a same community relationship in a proximity network, wherein each one of the electronic apparatuses comprises a Bluetooth device for enabling the plurality of electronic apparatuses to receive and transmit Bluetooth wireless signals with each other, with the proximity network connecting method comprising:
storing a community relationship data in each Bluetooth device;
storing a password data in each Bluetooth device;
reading the community relationship data of each Bluetooth device to identify whether each Bluetooth device has the same community relationship;
determining whether each Bluetooth device is in the proximity network; and
when the Bluetooth devices are identified to have the same community relationship with each other and are in the proximity network, allowing each electronic apparatus to receive and transmit the Bluetooth wireless signals with another electronic apparatus via each Bluetooth device when each Bluetooth device provides the same password data.

6. The proximity network connecting method as claimed in claim 5, wherein determining whether each Bluetooth device is in the proximity network comprises detecting a received signal strength indicator (RSSI) of each Bluetooth device.

7. The proximity network connecting method as claimed in claim 5, wherein reading the community relationship data of each Bluetooth device is performed when each Bluetooth device is in an advertiser mode.

8. An electronic apparatus comprising a Bluetooth device for establishing a proximity network, wherein the Bluetooth device comprises:
a community relationship module arranged for storing a community relationship data of the Bluetooth device;
a cryptography module arranged for storing a password data;
an identifying module arranged for determining whether a neighboring Bluetooth device corresponds to the community relationship data to identify whether the Bluetooth device and the neighboring Bluetooth device have the same community relationship; and
a distance detecting module, arranged for detecting a distance between the Bluetooth device and the neighboring Bluetooth device to determine whether the neighboring Bluetooth device is in the proximity network;
wherein when the neighboring Bluetooth device is identified to have the same community relationship of the Bluetooth device and is in the proximity network and when the neighboring Bluetooth device provides the same password data, the electronic apparatus is allowed to establish a connection with the neighboring Bluetooth device via the Bluetooth device.

9. The electronic apparatus as claimed in claim 8, wherein the distance detecting module is a received signal strength indicator (RSSI) detecting module.

10. The electronic apparatus as claimed in claim 8 further comprising:
a Wi-Fi wireless device or a 3G wireless device, with the Bluetooth device further comprising a recording module for recording a Wi-Fi address of the Wi-Fi wireless device, or an International Mobile Equipment Identity (IMEI) of the 3G wireless device.

11. The electronic apparatus as claimed in claim 8, wherein when the neighboring Bluetooth device is identified to have the same community relationship of the Bluetooth device and is in the proximity network, the Bluetooth device is arranged for generating a notification message to inform a user of the electronic apparatus.

12. A proximity network connecting method for an electronic apparatus, the electronic apparatus comprising a Bluetooth device for establishing a proximity network, with the proximity network connecting method comprising:
obtaining an advertising message of a neighboring Bluetooth device;
determining whether the Bluetooth device and the neighboring Bluetooth device have a same community relationship according to the advertising message;
determining whether the neighboring Bluetooth device is in the proximity network; and
when the neighboring Bluetooth device is identified to have the same community relationship of the Bluetooth device and is in the proximity network, establishing a connection between the Bluetooth device and the neighboring Bluetooth device, wherein determining whether the neighboring Bluetooth device is in the proximity network is performed by detecting a received signal strength indicator (RSSI) of the neighboring Bluetooth device.

13. The proximity network connecting method as claimed in claim 12, further comprising:
storing a password data in the Bluetooth device; and
allowing the electronic apparatus to establish a connection with the neighboring Bluetooth device via the Bluetooth device when the neighboring Bluetooth device provides the same password data.

14. The proximity network connecting method as claimed in claim 12, further comprising:
when the neighboring Bluetooth device is identified to have the same community relationship of the Bluetooth device and is in the proximity network, generating a notification message via the Bluetooth device to inform a user of the electronic apparatus.

* * * * *